Figure 1:
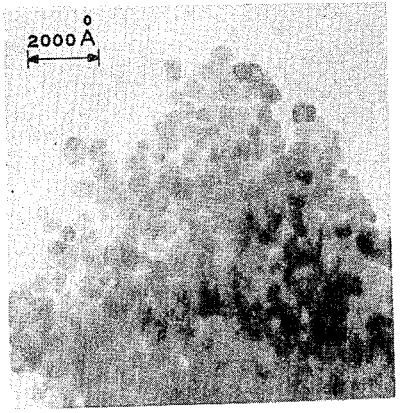
Figure 2:
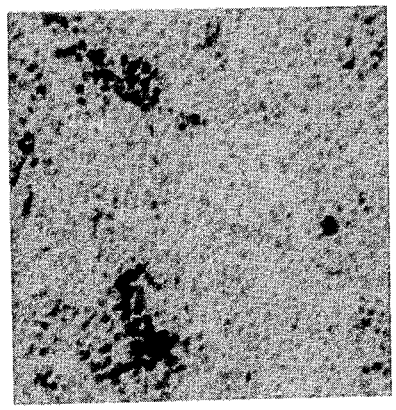

Jan. 11, 1966 J. R. THOMAS 3,228,881
DISPERSIONS OF DISCRETE PARTICLES OF FERROMAGNETIC METALS
Filed Jan. 4, 1963 2 Sheets-Sheet 1

DISCRETE PARTICLES OF FERROMAGNETIC METALS

INVENTOR
JOHN R. THOMAS
BY
ATTORNEYS

Jan. 11, 1966 J. R. THOMAS 3,228,881
DISPERSIONS OF DISCRETE PARTICLES OF FERROMAGNETIC METALS
Filed Jan. 4, 1963 2 Sheets-Sheet 2

DISCRETE PARTICLES OF FERROMAGNETIC METALS

INVENTOR
JOHN R. THOMAS
BY
ATTORNEYS

United States Patent Office 3,228,881
Patented Jan. 11, 1966

3,228,881
DISPERSIONS OF DISCRETE PARTICLES OF
FERROMAGNETIC METALS
John R. Thomas, Lafayette, Calif., assignor to Chevron
Research Company, a corporation of Delaware
Filed Jan. 4, 1963, Ser. No. 249,525
30 Claims. (Cl. 252—62.5)

This application is a continuation-in-part of applications Serial Nos. 18,855, filed March 31, 1960, now Patent No. 3,167,526; 55,704, filed September 13, 1960; 55,705, filed September 13, 1960; 141,628, filed September 29, 1961; 141,629, filed September 29, 1961; 141,630, filed September 29, 1961; 141,631, filed September 29, 1961; 141,632, filed September 29, 1961; 141,633, filed September 29, 1961; and 147,719, filed October 26, 1961, all now abandoned has been inserted.

This invention concerns the preparation and composition of small discrete particles of ferromagnetic metals. More particularly, this invention concerns the preparation and composition of discrete particles of at least one metal of atomic number 26 to 28, dispersed in an organic medium, wherein the size of the particles varies from about 10 to 1,000 A.

Magnetic properties of ferromagnetic metal particles of $10^3$ or fewer Angstroms diameter are significantly different from those of larger size. Particles of smaller than 1,000 A. are generally unable to accommodate a domain boundary or Bloch wall and are referred to as "single domain." These particles possess a net magnetic moment. "Ferromagnetic Domain Theory," C. Kittel and I. K. Galt, Solid Physics, 3,438 (1956). They respond to an external field by rotation of their magnetization vector, which is opposed by the particle's crystal anisotropy. Rotation away from the easy axis of magnetization is a more difficult process than domain boundary movement which occurs in multidomain particles. A significant coercive force results from rotation of the magnetization vector. Moreover, since the demagnetizing field of "single domain" particles is constant, the particles saturate at lower fields than are required for multidomain particles.

As the particles size is further diminished to about 100 A. or less, the energy required to rotate the magnetic vector against the crystal anisotropy becomes comparable with thermal energy. The coercive force becomes very small or zero, due to thermal relaxation. Such behavior is commonly known as superparamagnetism. Thus, by varying the size of the particles from about 10 to 1,000 A., one can vary the magnetic properties of the composition from compositions which show good permeability in the magnetic field, but do not retain their magnetization upon removal of the field, to compositions which have high coercive forces and provide good permanent magnets.

It has now been found that unique systems composed of particles of surprisingly uniform size in the range of about 10 to 1,000 A., can be prepared by the decomposition of organo-metallic compounds in a polymeric solution. By varying temperature, concentrations of the metal compound and polymer, and composition of the solvent and polymer, the average particle size may be varied over the range of about 10 to 1,000 A.

FIGURES 1-8 are electron photomicrographs of the particles prepared by the method of this invention.

The novel compositions are comprised of particles of one or more ferromagnetic metals, polymer and optionally solvent. The weight percent of the metal in the composition—metal and polymer—may be varied widely. Usually, the weight of the metal will be in the range of from about 0.1 or 1 to 98%. However, lower weight percents may be used. The weight ratio of the polymer to the metal will be at least about 0.01 and usually not exceed 100.

The particles are composed of at least one metal of atomic number 26 to 28, i.e., iron, cobalt and nickel. The preferred metals are of atomic number 26 to 27. The particles are shaped approximately spherical, cylindrical or parallelepiped and exist as discrete entities. They are discrete in being separated by an inert wall or buffer composed predominantly of an organic polymer. The presence of the polymer prevents the particles from being contiguous and bonding together to form larger particles. Thus, the metal particles size will be stable for indefinite periods of time. In some preparations, the particles exist as stable colloidal suspensions. In other preparations, the particles agglomerate, but are separated by polymer in the agglomeration and, therefore, remain discrete and mobile.

The size of the particles is in the range of from 10 to 1.000 A. (75%, preferably 85%, by weight of the metal is in this size range). By size is meant the diameter or the longest edge of the particle. As desired, preparations can be made in which the particles will be predominantly in the 10 to 150 A. range or in the 100 to 1,000 A. range (75%, preferably 85%, by weight of the metal). The particles show a surprising uniformity of size. Usually 85% by weight of the metal will be as particles within a factor of two of the mean average size, and 75% within a factor of 1.5 (i.e., ±50%).

Generally, the particles in the size range of 10 to 100 A. are superparamagnetic. However, the size limitations separating superparamagnetic and normally ferromagnetic properties differ from metal to metal and for different alloys, depending primarily upon the magnetic crystal anisotropy and the saturation magnetization of the material. Particles shape can also play a significant role.

The small particles do not retain their magnetization when an external field is removed and are also chemically very reactive. They usually form stable colloidal suspensions with a large variety of polymers. The larger size particles are ferromagnetic. The choice of polymer with the larger particles is more restricted when a stable colloidal suspension is desired.

The particles prepared in this invention, of the size 10 to 1,000 A., are predominantly of single domain (75%, preferably 85%, by weight of the metal is in particles of single domain character). The particular metal or alloy affects the size limitations separating single domain and multidomain particles.

The compositions containing the small discrete ferromagnetic particles are obtained by decomposing one or more organo-metallic compounds in the presence of one or more polymers in an inert medium.

The method of decomposition is customarily electromagnetic radiation or heat. The distinction intended is that energy rather than a chemical reagent is the means for inducing the bond breaking. Various methods of introducing sufficient kinetic energy to decompose the organo-metallic compound into metal and its organic parts can be used, heat, ultraviolet light, γ-radiation, soft β-radiation, etc. With organo-metallic compounds which, under the conditions of this process, are decomposable below 300° C., thermal decomposition is preferred.

It is found that during the course of the reaction, the reaction medium will become black and relatively opaque to ultraviolet light or other high energy (high as compared to thermal) types of radiation. Unless the reaction medium is kept as a thin film, the use of high energy radiation is very inefficient. Moreover, the system is inhomogeneous, reaction predominantly occurring near the radiation source.

The organo-metallic coordination compound is a compound of a metal of atomic number 26 to 28, having at least one bond with carbon, preferably coordinate, and more preferably, at least one coordinate bond to carbonyl (carbon monoxide). In coordination compounds or complexes, orbitals of the metal are involved which are not ordinarily used in the simple metal compounds. In iron, cobalt and nickle, the 3-d orbitals are involved. Various organic compounds and radicals are found in metal-coordination compounds or complexes. The more common ones are carbonyl, cyclopentadienyl, arenes, etc.

Some of the bonds to metal may be coordinate bonds to other elements than carbon, such as oxygen in ketones, nitrogen in nitrosyl, etc. Moreover, the metal may be bonded to more than 1 carbon radical or compound.

The particularly preferred compounds are those containing solely carbonyl as the coordinating carbon entity. These compounds include iron pentacarbonyl, iron tetracarbonyl, nickel tetracarbonyl, dicobalt octacarbonyl, tetracobalt dodecacarbonyl, etc. These compounds are decomposed by heat below 250° C.

The preferred metal compounds have the metal in a neutral or zero valent state.

Alloys of the ferromagnetic metals can be prepared by simultaneous decomposition of 2 or more organo-metallic compounds. However, it is found difficult in practice to find metal compounds which are soluble in the same solvent, decompose at similar rates, and are similarly affected by the polymer. In the cases where the decomposition rates are distinctly different, one obtains a mixture rather than a true alloy.

The solvent for the system must be inert and able to dissolve both the organo-metallic compound and the polymer. The solvent may be varied widely but will usually have a dielectric constant in the range of 1.7 to 20, preferably not higher than 15 and a particularly preferred range of 1.7 to 6. The solvents will rarely have more than 25 carbon atoms, and will generally have fewer than 20 carbon atoms per molecule. The carbon atom limit is one of expediency and is not critical to the preparation of the particles.

The hydrocarbon solvents may be aromatic or aliphatic. Non-aromatic hydrocarbons include hexane, octane, iso-octane, dodecane, decalin, cyclohexane, etc. Most aliphatic and cyclo-aliphatic hydrocarbons find use. Among aromatic hydrocarbons are benzene, xylene, toluene, cumene, mesitylene, tetralin, etc. Included among aromatic hydrocarbons are both the arenes and the alkarenes. The preferred hydrocarbon solvents are those of up to and including 15 carbons and free of aliphatic unsaturation; aromatic solvents are particularly preferred.

The non-hydrocarbon organic solvents will customarily have heteroatoms of groups V to VII of atomic number up to an including 17. Preferred solvents will have heteroatoms of groups VI to VII. However, because of the possibility of reaction with the organo-metallic compound and the metal product, solvents containing acid groups having acid dissociation constants greater than $10^{-11}$ should be avoided (generally not more than 10% and preferably less than 5% by weight). Such groups include phenols, carboxylic acids, sulfonic acids, phosphonic acids, etc. Solvents containing acid groups having acid dissociation constants greater than $10^{-6}$ should be particularly avoided (preferably less than 1% by weight).

Among non-hydrocarbon solvents which find use are halogenated hydrocarbons. Such solvents include both aliphatic and aromatic halogen compounds, but aryl halides are preferred. The preferred halogens of the halohydrocarbons are those of atomic number 9 to 35 and particularly preferred are those of atomic number 9 to 17. The metal in its finely divided state is chemically reactive and capable of reacting with compounds having ionizable halogen. Therefore, reactive halogen should be avoided, since in the presence of large amounts, the metal may be totally consumed.

Other solvents which find use are those containing oxygen. The solvents are ethers, esters, ketones, alcohols, etc. The solvents may be either aromatic or aliphatic. The preferred solvents have up to and including 15 carbons. Hydroxylic solvents are generally undesirable and preferred solvents are non-hydroxylic. This is particularly true when preparing iron particles. Exemplifying oxygenated solvents are octyl acetate, butyl butyrate, phenetole, diphenyl ether, dibutyl ether of diethylene glycol, phenyl ethyl ketone, ethyl benzoate, 2-octanone, etc.

While nitrogen may be present in the solvent, preferred solvents are those which do not have nitrogen. Compounds having active nitrogen-hydrogen bonds, such as in primary and secondary amines, should be particularly avoided. It is found that these compounds are able to react with metal carbonyl compounds and, therefore, are capable of changing the course of the reaction.

Mixed solvents can find use in particular applications. The mixed solvents may be mixtures of hydrocarbon, mixtures of non-hydrocarbons or combinations of hydrocarbons and non-hydrocarbons. By the use of mixed solvents, the dielectric constant may be varied and the solubility of the polymer and metal compound increased.

A polymeric material is essential to the preparation of the discrete metal particles. While the polymer's role is not understood, it would appear that the polymer is preferentially adsorbed on the particle's surface, forming a protective envelope or capsule and preventing the metal from aggregating. However, the polymer does not prevent the continued growth of the particle. The polymer also keeps the small metal particles suspended in the organic medium so that a stable colloidal suspension is frequently obtained. Usually only one polymer is used, but two or more may be used in particular situations.

The molecular weight of the polymer should be at least 350 and preferably 400. The maximum molecular weight may be as high as 10 million or even higher. Preferred molecular weights are those in the range of 1,000 to $2 \times 10^6$. Usually, the maximum molecular weight will be limited by the polymer's solubility in the solvent and the gelation of the medium. The polymer may be a homo- or a copolymer, generally having not more than 6 different monomers. However, there is no limit to the monomers that may be used, and in particular situations, it may be advantageous to have a broad range of monomers in order to tailor the polymer to a unique application.

The polymer may be hydrocarbon or non-hydrocarbon, but may not be solely aliphatic saturated hydrocarbon (at least 0.05% by weight of other than saturated aliphatic hydrocarbon). The more polar the groups present, the fewer that will be required. The heteroatoms will usually be of groups V to VII of the Periodic Table of atomic number less than 18. The elements are nitrogen, oxygen and fluorine of the 2nd Period and phosphorus, sulfur and chlorine of the 3rd Period. The Periodic Chart is the revised edition distributed by W. M. Welch Manufacturing Co., William F. Meggers (1956). The preferred elements are those of groups V to VI of up to and including atomic number 17 and particularly preferred are those elements of up to and including atomic number 8.

Most polymers will have at least about 1 heteroatom in the polymer per 500 atoms along the polymer backbone; the preferred ones are those having at least 1 heteroatom per 300 atoms along the polymer backbone.

The majority of polymers used will have 1 group having a dipole moment of greater than 1 Debye (D.) per 1 to 1,000 atoms along the polymer backbone, preferably 1 group per 1 to 500 atoms. The more preferred polymers will have a group substantially uniformly distributed in the polymer of a dipole moment of at least 1.5 D., but not more than 4.5 D. An execellent discussion of dipole moment, referred to as electric dipole moment, is found in Ingold. "Structure and Mechanism in Organic Chemistry," Cornell University Press, Ithaca, New York, 1953, pages 94 ff. An extensive list of dipole moments can be found in Arnold Weissberger et al., "Technique of Organic Chemistry," vol. VII, Organic Solvents, Interscience Publishers Inc., New York, 1955, pages 275 ff.

The dipole moment of a single group in a polymer is not readily measured. Customarily, the polymer as a whole is measured. However, in this invention, the polarity of the polymer as a whole is not as significant as the polarity of a small space in the polymer. Therefore, for the purposes of this invention, the polarity of a functional group will be determined in the following manner. The group will be considered as an entity from saturated aliphatic carbon to saturated aliphatic carbon. That is, the bonds after the first aliphatic saturated carbon to other than hydrogen will be broken and replaced with a hydrogen. The dipole moment of the resulting compound may then be determined and used as an approximate measure of the dipole moment of a space in the polymer. The space in the polymer may be considered an area, a group, a section, or any other term which will convey the notion of the existence of a dipole moment in a narrow portion of the polymer.

To illustrate the method, consider the polymer polylauryl methacrylate. In this polymer there would be 1 carboxy group every other carbon along the backbone. Breaking the bonds after the first saturated carbon on each side of the functional group, methyl acetate would be the analog. Methyl acetate has a dipole moment of about 1.75 D. There would, therefore, be one group having a dipole moment greater than 1 D. per 2 carbons along the chain. The polymer would have 12.6% of other than carbon and hydrogen. It would have an average dipole moment per atom of other than hydrogen of about 0.1 D./atom, and an average dipole moment per atom along the chain of about 0.88 D./atom.

Another illustration is a polymer of a 1:1 ratio of phthalic acid and maleic acid, with diethylene glycol as the diol. Cleaving the bonds at the saturated carbons, the analogs would be dimethyl phthalate, dimethyl maleate, and dimethyl ether. Dimethyl phthalate has a dipole moment of about 2.5 D., and dimethyl ether of about 1.1 D. A section of the chain of the following formula:

Another illustration is the polymer in which the heteroatom alternates with the carbon atoms. This is common to polymers which have aldehydes or imines as monomers. In these examples, the same saturated carbon will be considered as the methyl for 2 heteroatoms. (The same carbon is also considered for two groups with vinylidene compounds, e.g., vinylidene chloride, vinylidene cyanide, etc.) Consider polyformaldehyde in which a terminal section of the polymer would be:

$$-CH_2OCH_2OCH_2OCH_2OR$$

where R is an end group. There would be 3 groups having a dipole moment of about 1.1 D., i.e., the dipole moment of dimethyl ether, and 1 group per 2 atoms along the polymer chain. The other group would be an end group and would depend on the character of R. If R were hydrogen, then the group would be methanol having a dipole moment of 1.7 D. Ignoring the end groups, the polymer would have about 53% of oxygen and have an average dipole moment per atom other than hydrogen, as well as per atom along the polymer backbone, of about 0.5 D./atom.

Finally, a further illustration would be a copolymer of para-methyl styrene and acrylonitrile in a 3 to 1 ratio. According to our prior analysis, there would be 1 acetonitrile group per 8 atoms along the chain and 3 para-xylenes per 8 atoms along the chain. Acetonitrile has a dipole moment of 3.37. Para-xylene has a dipole moment of 0.

One of the failings in the use of dipole moments to define the type of polymer is the problem of internal compensation. Where a molecule permits symmetry, as in benzene and methane, functional groups which individually have high polarity, such as nitro or halo, can, when symmetrically disposed in the molecule, provide compounds with little or no overall dipole moment.

In some molecules, the internal compensation is small, e.g., dimethyl phthalate (2.3 D.) compared to dimethyl terephthalate (2.2 D.). Estermann, Z. physik. Chem., ATB. B, 1, 422–6 (1928). However, in a molecule, such as para-dichlorobenzene or para-dinitrobenzene, the internal compensation is significant. The dipole moment of ortho-dichlorobenzene is 2.33, while the dipole moment of para-dichlorobenzene is 0.23. Similarly, the dipole moment of ortho-dinitrobenzene is 5.98, while the dipole moment of para-dinitrobenzene is 0.58 D. Tignanik, Z. physik. Chem., ATB. B, 13, 425–61 (1931).

A comparison with the mono-substituted benzenes: methyl benzoate, 1.9 D.; chlorobenzene, 1.6 D.; nitrobenzene, 4.0 D., illustrates the great reduction in dipole moment because of internal compensation. In those groups or compounds in which the dipole moment is less than the mono-substituted compound because of internal compensation, the group should be considered as 2 mono-substituted groups, rather than as 1.

In actuality, the problem of internal compensation will be rarely met and will even more rarely significantly affect the limitations defined for the polymers. Therefore,

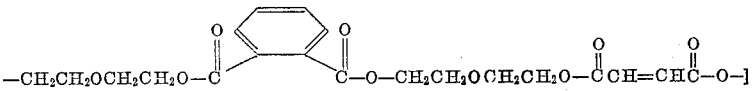

would be the average recurring unit. The number of atoms along the chain, counting the benzene ring as 6, would be 26. There would, therefore, be 4 groups of greater than 1 D. per 26 atoms along the chain. There would be 2 groups having dipole moments greater than 2 D. per 26 atoms and only 1 group of dipole moment of at least 2.5 D. per 26 atoms. The polymer would be 38% by weight of other than carbon and hydrogen; it would have an average dipole moment per atom other than hydrogen of about 0.2 D./atom, and an average dipole moment per atom along the polymer backbone of about 0.23 D./atom.

while such instances cannot be totally ignored, the problem is not a significant one.

The difficulty with dipole moment is that it is only a rough approximation of the ability of an atom or group to interact with a metal surface. This is in part an explanation of the failure of dipole moment in cases of internal compensation to explain the ability of various groups to be operable in this invention. The significant criteria for the polymer is that it is able to interact with the surface of the metal particle. The bond between the polymer and the particle must be of sufficient strength to have the polymer act as a buffer between the particles.

In essence, the interaction between the particle and the polymer must be strong enough to allow the polymer to adsorb in preference to solvent at the particle surface.

In those polymers in which the metal-polymer interaction is weak, the particle will be almost completely surrounded by solvent and will be able to interact with other particles. However, with polymers which have electrons not involved in sigma bonding, e.g., unsaturated carbon, oxygen, nitrogen and fluorine atoms, even though the dipole moment of the groups may be relatively low, the polarizability (the ability to have a local dipole induced by an external charge or an induced external charge) of the group can be sufficiently high to provide a strong interaction between the metal surface and the polymer group. While the dipole moment is only a rough indication of the capability of a polymer to interact with the metal particles, in most cases it will suffice.

Most polymers will have at least 0.1% by weight of other than carbon and hydrogen and preferably not more than 60%. Preferred polymers will have from about 1 to 40% by weight of other than carbon and hydrogen. Usually, the non-hydrocarbon portion will be those heteroatoms indicated previously. Moreover, most polymers will have an average dipole moment per atom other than hydrogen in the range of about 0.005 to 1.0 D./atom, preferably 0.01 to 0.5 D./atom.

The majority of polymers will also have an average dipole moment per atom along the polymer backbone in the range of about 0.1 to 2.5 D./atom, preferably about 0.2 to 1.5 D./atom. These values are derived by totaling the dipole moment of all the groups present in the polymer and then dividing by the number of atoms in the polymer backbone. This value is distinguished from the above value, the average dipole moment per atom in the polymer, in that it more closely reflects the spacing of the polar groups along the polymer backbone. The dipole moment of any individual group will rarely exceed 5.0 D. and even more rarely exceed 5.5 D. Usually, the most polar group in the polymer will be a urea or a thiourea. The least polar group is exemplified by ethane or other aliphatic hydrocarbons.

While some acid groups are permissible in the polymer, they are not preferred and should generally be avoided. It is preferred that fewer than 10% and, particularly preferred, fewer than 5% by weight of the polymer be acids having an acid dissociation constant of greater than $10^{-11}$. Those acids having an acid dissociation constant greater than $10^{-6}$ should be preferably fewer than 1% and particularly preferred fewer than 0.5% by weight of the polymer.

The polymers should preferably have fewer than 10% by number of functional groups of amine nitrogen. It is further preferred that fewer than 5% by number of the functional groups have amine nitrogen containing nitrogen-hydrogen bonds, i.e. primary and secondary amines. Amine nitrogen is to be distinguished from amide nitrogen in which the basicity of the nitrogen is significantly lower. Such groups as sulfonamide, carboxamide, and imide are permissible and may range up to 100% of the functional group present.

Various hydrocarbon radicals are present in the monomers. They appear as groups in esters, as substituents on nitrogen, as groups on benzene rings, etc. They will usually be less than 20 carbons. They include alkyl, aralkyl, alkaryl, etc. The hydrocarbon substituents, in turn, may be substituted by heteroatoms. For example, 2-(N,N-dimethylamino)ethyl acrylate has both a tertiary amine function and an ester function. In this way, a single monomer may have 2 or more functional groups.

When discussing types of polymers it is intended that at least 50% by weight of the polymer is composed of the particular type of monomer.

One class of polymers is addition polymers. These polymers for the most part are formed by the linking together of groups having aliphatic ethylenic unsaturation. For the most part, the addition polymerizable monomers have the formula:

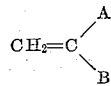

where A and B can be hydrogen, alkly, cycloalkyl, aryl, alkaryl or various groups which have free electrons (non-sigma bonded). The most common free radical addition polymerizable olefins will have at least one of A and B as groups having free electrons not involved in sigma bonding. These groups will be discussed subsequently as functional groups.

A few monomers which can be addition polymerized have the formula:

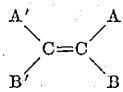

A' and B' are defined in the same manner as A and B which have been defined previously. Rarely, will there be more than 2 functional groups present. In most instances, the monomers will not be capable of homopolymerization, but can be successfully copolymerized. Various examples of these monomers will appear in the subsequent discussion.

A large number of addition polymers are hydrocarbons, i.e., those where A and B are hydrogen, aliphatic hydrocarbon or aromatic hydrocarbon. For hydrocarbon polymers which are not modified with heteroatoms, at least one of A and B must be aromatic. The aromatic addition polymers will usually be styrene or hydrocarbyl-substituted styrenes, e.g., meta-methylstyrene, α-vinylnaphthalene, 2,4 - dimethyl-1-vinylbenzene, α - methylstyrene, etc. Among the aromatic hydrocarbon polymers, it is preferred to have 1 monomer per 500 monomers and particularly preferred to have 1 monomer per 300 monomers having a group having a dipole moment of greater than 1 D. In particular applications, it is freqeuntly preferred to have at least 1% of the number of monomers having a group having a dipole moment greater than 1 D. and, in some distances, 10% of the groups having dipole moments of greater than 1 D. Usually, the fewer the polar groups the higher the molecular weight that is preferred. With those polymers having fewer than 1 polar monomer per 300 monomer group, it is preferred to have a molecular weight of at least about 10,000.

The hydrocarbon polymers, including both the aliphatic and the aromatic, may be modified with polar groups to introduce polarity into the polymer. The hydrocarbons may be modified in various ways, such as sulfonation, halogenation, nitration, oxygenation, etc. Groups introduced include sulfonic esters, sulfenyl chloride, sulfonamides, chlorine, bromine, nitro, hydroxy, etc. In these polymers, it is preferred to have about 0.1 to 40% by weight of other than hydrocarbon.

The non-hydrocarbon addition polymers will generally be composed of at least a majority of monomers containing heteroatoms. Preferably the percent of monomers containing heteroatoms should be in the range of 60 to 100% and particularly preferred 75 to 100%. Among the common functional groups which are found in addition polymerizable olefins are: halogen, carbonylic: oxo-carbonyl—ester, amide, carboxylic acid, anhydride, carbamate—and non-oxo-carbonyl—ketone, aldehyde—oxy: alcohol and ether, thiol and thioether, amines, nitriles, nitro, inorganic acid derivatives—sulfones, sulfonamides, phosphates, phosphonates, phosphonamides, thiophosphates—etc. A and B of the previously indicated formula may be any of these groups as well as a hydrocarbon, with the proviso that at least one of A and B must be a functional group other than hydrocarbon. A and B will range from 0 to 20 carbons each and will preferably be not more than 16 carbons. The monomer will generally be not more than 25 carbons, and preferably not more than 20 carbons.

Various groups of monomers find general use. Among these various groups are the following:

Acrylics, e.g., acrylic acid, methacrylic acid, α-chloroacrylic acid, methyl α-chloroacrylate, β-chloroethyl α-chloroacrylate, methyl α-ethylacrylate, amyl acrylate, hexadecyl acrylate, 2-tetrahydrofurfuryl methacrylate, cyclohexyl methacrylate, N,N - dimethylmethacrylamide, N,N-dimethylaminoethyl methacrylate, 2-fluoropropyl methacrylate, 2-ethoxyethyl acrylate, etc. Also included in this category should be derivatives of maleic acid and fumaric acid, such as maleic anhydride, ethyl maleate, butyl fumarate, maleimide, etc.;

Vinyl and allyl alcohols, ethers and esters, e.g., vinyl alcohol, vinyl acetate, vinyl ethyl carbonate, vinyl butyl ether, vinyl phenyl ether, vinyl benzyl acetate, vinylcarbinol, vinyl benzoate, vinyl ethyl ether, vinyl polyethyleneglycol, vinyl isopropyl ether, vinyl methyl sulfide, vinyl mercaptan, vinyl naphthoate, vinyl stearate, vinyl phenyl thioether, vinylene carbonate, isopropenyl acetate, isopropenyl phenyl ether, allyl stearate, etc.;

Vinyl halides including the haloprenes, e.g., vinyl fluoride, vinyl chloride, vinylidene chloride, fluoroprene, chloroprene, etc. The monohalo vinyl halides are preferred. The halides that are preferred are those of atomic number of not more than 35, and preferably not more than 17. It is found with vinylidene halides, the gem.dihalide is reactive to the finely divided metals. In the presence of a polymer containing large amounts of gem.dihalide, much of the metal may be consumed in the reaction. To the degree that the gem.dihalides are reactive with the metals, they should be avoided;

Vinyl amines and amides, e.g., vinyl pyrrolidone, N,N-dimethyl vinyl amines, N-vinyl glutarimide, N-vinyl N-phenyl acetamide, N-vinyl caprolactam, N-vinyl diphenylamine, etc. As already indicated, homopolymers of amines should be avoided, but the monomers can be used in copolymers;

Vinyl cyanides, e.g., acrylonitrile, methacrylonitrile, α-chloroacrylonitrile, vinylidene cyanide, maleinitrile, etc.;

Vinyl derivatives of inorganic acids, e.g., dimethyl vinyl phosphate, vinyl phenyl sulfone, vinyl butanesulfonate, dimethyl ethylenephosphonate, etc.;

Vinyl heterocycles, e.g., N-vinylpyrrole, N-vinylindole, N-vinylcarbazole, 2-vinylpyridine, 2-vinylquinoline, 2-vinylfuran, 2-vinylthiophene, 2-vinylbenzofuran, etc.;

Hetero-substituted styrenes, e.g., cyanostyrene, para-nitrostyrene, para-chlorostyrene, meta-carbethoxystyrene, α-chlorostyrene, etc. In this category, the functional groups are generally bonded to the aromatic ring.

As already indicated, the groups that are attached to functional groups, such as in esters or in the nitrogen of the amide, may be further substituted by other functional groups. In this way, relatively small areas within the polymer may have a large number of polar groups. In this invention, however, the polar groups will be counted, whether they are directly bonded to the polymer backbone or appear on a side chain. However, it is preferred that for the most part the polar groups be directly bonded to the polymer backbone. In particular situations, it may be preferable to include groups bonded to the side chain.

The preferred addition polymerizable olefins have at least from 70 to 75% of the functional groups of dipole moment of from 1 to 2 D., such as hexyl methacrylate, lauryl methacrylate, methyl methacrylate, ethyl acrylate, cyclohexyl α-chloroacrylate, hydroxyethyl methacrylate, vinyl butyrate, etc. For the most part, the polymers are polyesters and polyhalides.

Another class of polymers which finds use is condensation polymers. These polymers differ from addition polymers in that during the polymerization reaction, simple molecules, such as water, alcohol, hydrazide, or salts are eliminated. While there are exceptions to this statement, such as polymers of epoxides and aldehydes, for the most part the statement is valid. Another way of distinguishing condensation polymers from addition polymers is that in condensation polymers usually sigma bonds are broken and new sigma bonds formed, while in addition polymer pi bonds between carbon atoms are broken and sigma bonds are formed.

The condensation polymers will usually have a molecular weight in the range of about 350 to 1,000,000 and more generally in the range of about 400 to 750,000. Preferred polymers are those that do not have more than 1 group having a dipole moment greater than 2.5 D. per 10 atoms other than hydrogen.

Groups having high dipole moment should be separated by groups of lower dipole moment. There should be at least 1 or more atoms intervening between groups of greater than 2.5 D. The saturated carbon bonded to the functional group is considered part of the group and is not counted as an intervening atom.

The same functional groups appear in both addition and condensation type polymers. These have already been listed in the discussion of the addition polymers.

The monomers used in condensation polymers may have 1 or more functional groups. The preferred monomers are those which have from 1 to 2 functional groups. While cross-linking is permissible, usually cross-linking will reduce the solubility of the polymer in common solvents. To that extent, those polymers having little or no cross-linking are preferred.

One group of monomers includes epoxides, aziridines and polyols, particularly glycols. Illustrative monomers are oxirane, aziridines, propylene oxide, isobutylene oxide, styrene oxide, 2,2-dimethyl aziridine, ethylene glycol, glycidyl methyl ether, glycidyl chloride, glycidyl benzoate, etc.

Another group of monomers are those having non-oxo-carbonyl groups, in which the carbonyl is bonded to 1 carbon atom. These compounds when polymerized are usually polyesters, polyamides and, in a few specific cases, polyanhydrides. Illustrative acid monomers are maleic acid, fumaric acid, phthalic acid, isophthalic acid, terephthalic acid, succinic acid, sebacic acid, itaconic acid, etc. Usually, the acids will be from 2 to about 15 carbons. Illustrative alcohol monomers are butanediol, diethylene glycol, polyethylene glycols, usually of up to and including about 5,000 molecular weight, resorcinol, hydroquinone, 1,2-cyclohexanediol, glycerol, etc. The polyols will usually be of from 2 to 15 carbons (except for the polyalkylene polyols) and preferably will have not more than 3 hydroxyl groups, glycols being particularly preferred. Among polyamine monomers are hexamethylene diamine, phenylene diamine, tetramethylene diamine, decamethylene diamine, ethylene diamine, di-(2-aminoethyl) ether, etc. Also included in this class are lactams and lactones, e.g., caprolactam, butyrolactone, dimethyl butyrolactone, valerolactam, etc. Also included in this class are amino acids and hydroxy acids, e.g., ω-aminopelargonic acid, ω-aminovaleric acid, 4-aminocyclohexane, 2-hydroxy cyclopentylcarboxylic acid, hydroxyacetic acid, polyethylene glycolacetic acid, etc.

The acid number of the polymer should be kept low, preferably less than 10, and particularly preferred, less than 5.

Another group of monomers are those having a non-oxo-carbonyl which is not bonded to carbon. These include urea compounds, carbamates, carbonates, etc., and their thio analogs. The carbonyl containing monomer groups will usually have the functionality of a thiocyanate, isothiocyanate, carbonyl (e.g., phosgene) or isocyanate, etc., and be polymerized with polyols or polyamines.

Another group of monomers are those based on oxo-carbonyl groups, e.g., aldehydes, which includes polyaldehydes, phenol-aldehyde polymers and urea-aldehyde polymers. These polymers are well known in the art and do not require elaboration.

Among polymers which do not come within any one classification are natural polymers. Illustrative of such polymers are lecithin, cellulose derivatives, such as cellulose acetate and cellulose methyl ether, etc.

The condensation polymers may be a combination of the various monomers. Isocyanates may be used with carboxylic acids, polyepoxides may be introduced into various other condensation polymers, phenol-aldehyde polymers may be modified with glycidyl ether and then further modified with polyepoxides, etc. Moreover, condensation polymers may be joined with addition polymers. For example, a condensation polymer containing maleic acid may be modified with styrene. A polyacrylate may be modified with a polyepoxide. As in the prior polymers, also in the combination polymers, it is preferred that at least 70, preferably 75%, of the groups have a dipole moment of from 1 to 2 D.

Polar polymers are preferred for particles in the size range of from 10 to 150 A. The preferred polymers are those having an average dipole moment per atom other than hydrogen of at least 0.25 and preferably 0.3. Also preferred are polymers having at least 1 group per 25 atoms, preferably per 10 atoms, in the polymer chain of at least 2.5 D. For particles in the size range of 100 to 1,000 A., less polar polymers are preferred. Large particles may also be produced using the more polar polymers in a solvent of relatively high dielectric constant.

The temperature used in the preparation of the metal will depend on the method of decomposition, the organo-metallic compound and the particular solvent and polymer used. It is found that both polymer and solvent have a small effect on the rate of decomposition. Usually, the temperature will be in the range of about $-50°$ C. to $300°$ C., preferably $250°$ C. With methods which introduce high energy radiation, such as ultraviolet light or $\gamma$-rays, relatively low temperature can be used. Contrastingly, when thermal decomposition is used, higher temperatures are required. For example, in the thermal decomposition of cobalt carbonyl, temperatures will usually be in the range of about $85°$ to $225°$ C. and preferably in the range of about $100°$ to $200°$ C. However, in the thermal decomposition of iron carbonyl, temperatures will usually be in the range of about $140°$ to $275°$ C. and preferably in the range of about $150°$ to $225°$ C. Nickel carbonyl is decomposed in the range of about $60°$ C. to $120°$ C.

The pressure for the system will generally be autogenous. However, higher pressures may be useful particularly when using low boiling solvents. Pressures will usually not be above 250 p.s.i. However, the pressure is not critical and does not have a significant effect upon the process, as long as the carbon monoxide pressure is kept below the decomposition pressure of the metal carbonyl.

The concentration of the metal compound in the solution may be varied widely. Usually, the minimum concentration will be about .01% by weight, that is about 0.01 gram per 100 ml. Preferably, the concentration will be at least 0.1% by weight, 0.1 gram per 100 ml., to saturation of the solvent at the temperature of the decomposition. Customarily, the concentration will range from about 0.05 to 35 parts of metal compound per 100 parts of solvent. For particles in the range of about 10 to 100 A., low concentrations are preferred. Generally, the concentrations will be in the range of about 0.01 to 10 parts per 100 parts of solvent. For particles in the size range of 100 to 1,000 A., somewhat more concentrated solutions are preferred. Customarily, the concentration will usually be in the range of about 1 part of metal compound per 100 parts to the saturation of the solvent.

The polymer-metal ratio is not critical, once a minimum ratio has been achieved. The polymer/metal-compound weight ratio will usually be in the range of about 0.01 to 20 and preferably in the range of about 0.05 to 15. The effect of the polymer is sensitive to its composition, and no broad generalization concerning polymer to metal ratio can be made. The concentration of the polymer will be determined by the concentration of the metal compound and the ratio of polymer to metal desired. It is generally preferred that the concentration of the polymer be not less than 0.01 part per 100 parts of solvent. Generally, the range of concentration will be from about 0.05 part to about 25 parts of polymer per 100 parts of solvent. The maximum concentration will be sensitive to the solubility of the polymer and the tendency to gel irreversibly in applications in which this is undesirable.

The method of addition may be either batchwise or by incremental addition. All the components may be put together in a flask and brought to the desired temperature. Alternatively, the polymer and solvent may be mixed together and the organo-metallic compound added as a solid or in a suitable solvent.

The time for the addition will vary according to the compound being used, the temperature at which the reaction is run, and the method of decomposition. Usually, the time may vary from 1 or 2 minutes to 60 minutes or more. Preferably, the time will range from about 5 minutes to about 48 hours. The time is not critical and will be determined by the end of the carbon monoxide evolution. Running the reaction to completion is not essential but is expedient. When discussing concentrations, it is intended that the reactions have been run to completion.

It is preferred to carry out the reactions in the absence of oxygen. However, small amounts of oxygen may be present. Gases, such as nitrogen, helium, argon, etc., may be used to provide an inert atmosphere for the process.

When carrying out the reaction, in the presence of oxygen or some acidic materials, some of the metal may react and form the metal oxide or salt. It is found that small amounts of the oxide or salts are not detrimental to the particles for their use in various applications. Usually, it is preferred to have less than 10% of the metal in the form of an oxide or a salt. The oxides or salt can be easily avoided by minimizing the amount of oxygen present during the process and by avoiding the use of gross amounts of acid.

The reaction is conveniently run by introducing the desired solvent, the metal organic compound and the polymer into a reaction vessel. The vessel has stirring and condensing means. Prior to the decomposition, the vessel is swept free of oxygen with an inert gas. When the method of decomposition is thermal, the system can be conveniently heated by a variety of means. With proper choice of solvent the temperature may be controlled by having the desired temperature the same as the reflux temperature of the solvent. With metal carbonyl compounds, the mixture is then refluxed until the theoretical amount of carbon monoxide has been evolved and often for a short period longer. The product is then cooled. Most frequently the original product appears as a black suspension. The suspension is generally stable for relatively long periods of time, usually much in excess of a day.

The composition is generally analyzed for its magnetic properties in a BH meter and examined in an electron microscope for its appearance.

It has been found with the decomposition of carbonyl compounds that it is preferable to have a refluxing solvent. In this way, the carbon monoxide is rapidly removed from the reaction medium. Moreover, it is preferable to have a rather rapid rate of reflux, rather than just a mild reflux.

As indicated, the product is usually a stable colloidal suspension. Sometimes, however, the mixture is thixotropic and occasionally, with some polymers and at some metal concentrations, sedimentation occurs. For most uses, it is not necessary to have a stable suspension. Thixotropic mixtures will flow with stirring. Even the products which sediment, usually, are sufficiently fluid to be spread.

The stable colloidal suspensions are dependent upon the solvent, the polymer, the concentration of metal, and the polymer-metal weight ratio. It is found that for stable dispersions, it is best to have a solubility parameter for the solvent and the polymer which is similar. That is, the solubility parameter of the polymer should not differ by more than 2 units from the solvent used. The preferred solubility parameters for solvents are in the range of about 8.0 to 10.0. However, it is important that the solvents in the range be inert to the metal.

A definition of solubility parameter is found in Tobolsky, "Properties and Structure of Polymers," John Wiley & Sons, New York (1960), pages 64 ff. The solubility parameter is defined as the square root of the cohesive energy density. The cohesive energy density is defined as the molar energy of vaporization divided by the molar volume. While these properties are relatively easily determined for a solvent, they are difficultly determined for a polymer. Therefore, the solubility parameter for the polymer is not obtained directly. Rather, a slightly cross-linked polymer is prepared and a series of identical samples of the polymer are placed in a series of liquids of known solubility parameter. The extent of swelling caused by the various solvents is plotted against the solubility parameter of the solvent. A bell shaped curve is obtained and the maximum value is defined as the solubility parameter for the polymer.

The stable colloidal suspension will contain at least 65% by weight of solvent and preferably at least 80% by weight of solvent. The weight of metal will customarily be in the range of about 0.01% to 20% by weight, preferably to 10%. The polymer will be at least 2,000 and preferably 10,000 molecular weight and will be in a polymer to metal weight ratio of about 0.1 to 5.

When agglomeration of the polymer surrounding the particles occurs, the particles may be redispersed by removing the solvent and vigorously agitating the polymer, e.g., Waring blender, in the presence of a more polar solvent than the one used for the preparation of the particles.

The following examples are offered by way of illustration and not limitation.

EXAMPLE I

Into a flask fitted with a stirrer and a condenser and having been swept free of oxygen by nitrogen was introduced 12 grams of cobalt octacarbonyl, 1.75 grams of a polyethylene glycol of about 6,000 molecular weight, and about 100 ml. of toluene and the mixture heated to reflux. The mixture was allowed to reflux for a period of about 5 hours, by which time all of the carbon monoxide had been evolved. The product was cooled, and the dark dispersion was examined for its magnetic properties in a BH meter and in an electron microscope. The product showed a coercivity[1] in a 1,000 oersted (oe.) field of 265 oe. and a remanence ratio of 0.36 in the same field. FIG. 1 shows an electron micrograph at 70,000 magnification. The particles are predominantly of the order of about 150 to 700° A. size.

EXAMPLE II

The procedure was carried out as described in Example I except that a polyethylene glycol having tolylene di-isocyanate end groups of about 1,400 molecular weight was substituted for the polyethylene glycol. The product had a coercive force of 165 oe. and a remanence ratio of 0.34. A photomicrograph of the product at 160,000 magnification appears in FIG. 2. The particles are predominantly in the range of about 60 to 150 A.

EXAMPLE III

Figure 3:
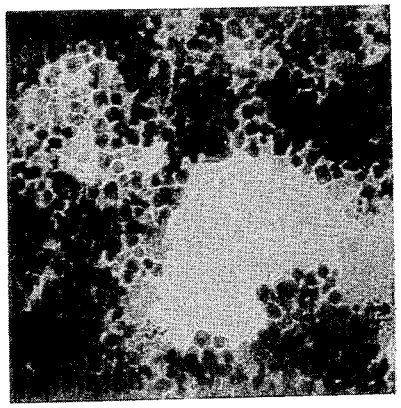
Figure 4:
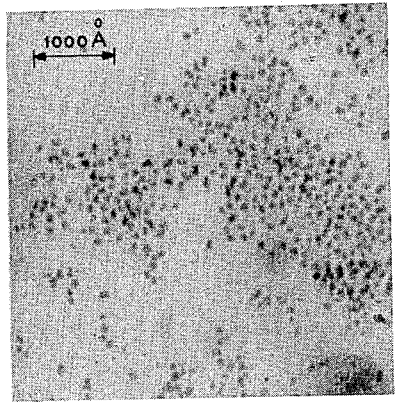
Figure 5:
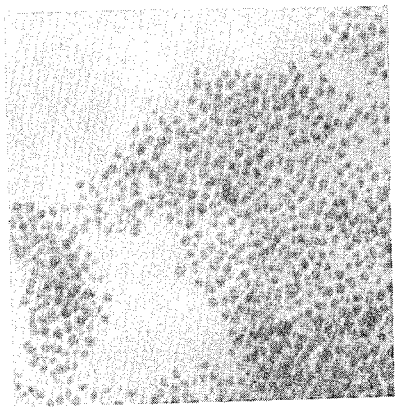

The procedure was followed according to Example I except that chlorobenzene was used in place of toluene and the polymer was a vinyl chloride/vinyl acetate copolymer, wherein about 1% of the vinyl acetate groups had been hydrolyzed. The product had a coercivity of 181 oe. and a remanence ratio of 0.47. A photomicrograph of the articles at 160,000 magnification is shown in FIG. 3. The particles are predominantly of the order of about 100 to 300 A.

EXAMPLE IV

The procedure was followed according to Example I except that the polymer was replaced with lecithin. The particles were examined under electron microscope and a photograph taken at 160,000 magnification, which appears as FIG. 4. The particles are in the order of about 50 to 100 A.

EXAMPLE V

The procedure was carried out according to Example I except that a polyethylene glycol having tolylene di-isocyanate end group of about 1,000 molecular weight was used as the polymer. An electron photomicrograph which appears as FIG. 5 at 160,000 magnification shows them to be predominantly in the range of about 50 to 120 A.

EXAMPLE VI

Figure 6:
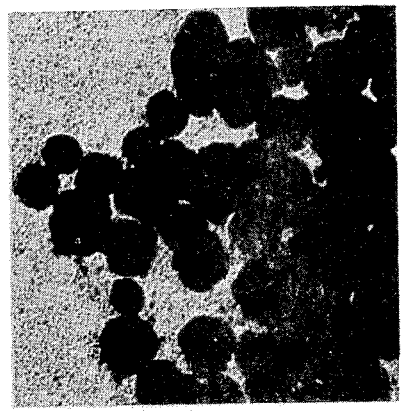

The procedure was followed according to Example I, except that a polyethylene glycol polyol of about 15,000 to 20,000 molecular weight was used as the polymer. The product had a coercive force of 204 oe. and a remanence ratio of 0.25. An electron micrograph at 160,000 magnification which appears as FIG. 6 showed the particles to be in the size range of about 400 to 900 A.

EXAMPLE VII

Figure 7:
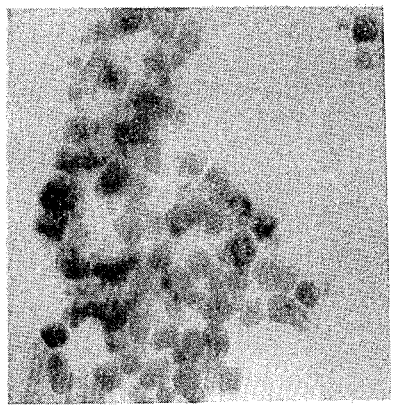
Figure 8:
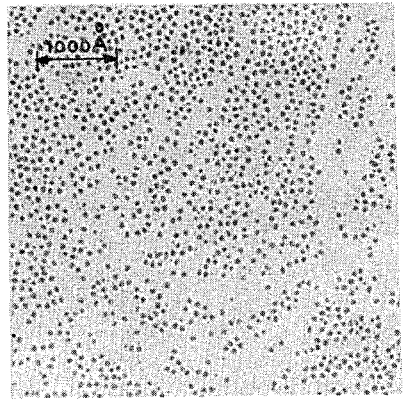

The procedure of Example I was followed except that chlorobenzene was used as a solvent and the polymer was a polycarbonate of 2,2-bis-(4-hydroxyphenyl)propane alcohol of about 50,000 molecular weight. The product had a coercive force of 308 oe. and a remanence ratio of 0.42. A photomicrograph of the product at 160,000 magnification which appears as FIG. 7 showed the particles to be predominantly in the range of about 200 to 400 A.

EXAMPLE VIII

Into a flask, as described in Example I, was introduced 25 ml. of iron pentacarbonyl, 3 grams of a hexyl methacrylate/hydroxyethyl methacrylate polymer in a ratio of monomers of 300:1 and 240 ml. of xylene. The product was refluxed until the carbon monoxide evolution was complete. The resultant product showed a coercivity of 2.5 oe. measured at 5 oe. A photomicrograph of the product at 160,000 magnification showed the particles to be in the 10 to 50 A. range. The photomicrograph appears as FIG. 8.

EXAMPLE IX

Into a flask fitted with a stirrer and dropping funnel was introduced 1.48 grams of a methyl methacrylate/ethyl acrylate polymer (35:65) in 200 ml. of xylene. The flask was swept with nitrogen and the mixture heated to a rapid reflux. Ten grams of cobalt octacarbonyl were dissolved in 300 ml. of xylene and added at a rate of about 10 ml. per minute to the reaction vessel. After 1 hour from the initial addition, the reaction was stopped. The resultant product had a coercivity of 330 oe. and a remanence ratio of 0.42.

---

[1] Except where otherwise indicated, coercivity is reported as intrinsic coercivity in a 1,000 oe. field.

EXAMPLE X

The procedure of Example I was followed using 2 grams of Ni(CO)$_4$ and 2 grams of a methyl methacrylate:ethyl acrylate:vinyl pyrrolidone (39:72:1) polymer in 100 ml. of benzene. The system was refluxed for 4 hours. Electron microscope examination of the product showed discrete nickel particles of about 200 A size.

EXAMPLE XI

Into 100 ml. of iso-octane containing 0.5% by weight of a copolymer of dodecyl methacrylate and N-vinyl pyrrolidone was introduced 200 mg. of nickel tetracarbonyl. This solution was exposed to high intensity ultraviolet radiation using a high pressure air cooled mercury arc operating at 60 cycles per second. Oxygen was removed prior to the decomposition by flushing with nitrogen.

The resulting dark suspension exhibited a strong ferromagnetic resonance when studied in the electron paramagnetic resonance spectrometer. It showed a g. value of about 2.2 and a line width of about 500 gauss.

The following tables illustrate numerous examples with various polymers and differing solvents, which were used in the preparation of the small particles of magnetic metals. Table I is concerned primarily with the preparation of cobalt particles, while Table II is concerned primarily with the preparation of iron particles.

The samples were prepared in accordance with Example I. The particle sizes were determined by means of an ultracentrifuge or estimated from electron micrographs.

In taking the electron photomicrographs, a one ml. sample was diluted to a total of ten ml., shaken and one drop smeared on an electron microscope sample grid (Formvar Substrate-Ladd Research Industries). After drying, electron photomicrographs of the sample were taken using a J.E.M. Model 6A electron microscope. Usually 40,000 magnification was used, and the photographs enlarged 4 times.

In order to test the magnetic properties of the dispersions of the ferromagnetic metals, small polymeric blocks were cast approximately 2 inches square by $3/16$ inch thick. This was done by pouring a concentrated dispersion containing the polymer into cellulose acetate molds and allowing the solvent to evaporate under slightly elevated temperatures. A solid sample was thus obtained. In some cases the specimen was cast in a magnetic field. Magnetization curves were run in the usual manner by inserting the sample in an electric coil.

In most examples, however, a portion of the cobalt particle sample was stirred in a high shear blender for about one minute. The mixture was then coated on 1 mil Mylar (Du Pont terephthalate polyester) with a paint applicator. The applicator gate was set to give a dry coating 0.1 to 0.2 mil thick. The coating was dried mostly by evaporation, the last part of the solvent being removed with an infrared lamp.

Magnetic properties of the particles were measured with a BH meter (Scientific-Atlanta Inc., Model 651B). When referring to "B" (flux density), what is intended is B-H or $4\pi I$, where I is the intensity of magnetization and H is the strength of the applied field. Therefore, values are reported as intrinsic coercive force, namely, the reverse field necessary to bring the quantity B-H back to zero.

*Table I*

| Polymer [1] | Polymer Gms. | Polymer Approx. M.W. | Co$_2$(CO)$_8$, gms. | Solvent [2] | Ml. | Time [3] hrs. | H$_{ic}$ 1,000 oe. | Br/Bs | gms. Co$_2$(CO)$_8$,[4] ml. solvent | Rate [5] of add'n, ml./min. | Particle size range A. |
|---|---|---|---|---|---|---|---|---|---|---|---|
| EA(111)VP(1) | 2 | 3×10$^5$ | 6 | T | 500 | 4 | 425 | 0.37 | | | 200–300 |
| EA(111)VP(1) | 2 | 3×10$^5$ | 24 | T | 500 | | 310 | 0.46 | | | |
| EA(111)VP(1) | 1 | 3×10$^5$ | 12 | T | 500 | | 220 | 0.19 | | | |
| VAc(56)VP(1) | 1 | 2×10$^4$ | 12 | T | 500 | 4 | 50 | <0.1 | | | 20–150 |
| VAc(115)VP(1) | 1 | 5×10$^4$ | 12 | T | 500 | 4 | 150 | 0.17 | | | |
| MMA(39)EA(73)HPMA(1) | 1.5 | 3×10$^5$ | 10 | T | 250 | 5.5 | 450 | 0.44 | 10/100T | 1.5 | 150–200 |
| VCl(91)VAc(6)VAl(3) | 1.5 | | 20 | T / MIBK | 225 / 5 | 6 | 300 | 0.4 | 20/95T–5MIBK | 1.5 | 100–200 |
| VAc(28)VSt(28)VP(1) | 1 | 3×10$^4$ | 12 | T | 500 | | 50 | 0.1 | | | 20–150 |
| MMA(47)EA(64)VP(1) | 1.5 | 3×10$^5$ | 12 | T | 500 | 4 | 100 | 0.24 | | | 100–200 |
| MMA(47)EA(64)VP(1) | 1.5 | 3×10$^5$ | 12 | T | 800 | 4 | 200 | 0.36 | | | 200–300 |
| MMA(37)EA(69)VP(1) | 1.5 | 3×10$^5$ | 12 | T | 500 | | 100 | 0.18 | | | 50–150 |
| MMA(37)EA(69)VP(1) | 1.5 | 3×10$^5$ | 12 | T | 800 | 4 | 275 | 0.24 | | | 100–200 |
| MMA(37)EA(69)VP(1) | 10.8 | 3×10$^5$ | 94 | T | 1,000 | 10 | 263 | 0.58 | | | |
| MMA(37)EA(69)VP(1) | 10.8 | 5×10$^5$ | 94 | T | 1,000 | 10 | 382 | 0.62 | | | |
| MMA(37)EA(69)VP(1) | 32.2 | 3×10$^5$ | 94 | T | 1,000 | 4 | 348 | 0.57 | | | |
| MMA(37)EA(69)VP(1) | 3.6 | 5×10$^5$ | 94 | T | 1,000 | 4 | 291 | 9.53 | | | |
| MMA(4)EA(5)VP(1) | 10.8 | 3×10$^5$ | 94 | T | 1,000 | 4 | 0 | 0 | (superparamagnetic | | |
| MMA(50)VP(1) | .2 | 1×10$^5$ | 2 | T | 100 | 5 | 40 | 0.14 | | | |
| MMA(35)EA(70)HEMA(1) | 3.0 | 1×10$^5$ | 2.7 | T | 200 | 8 | 192 | 0.32 | | | |
| EA(24)VP(1) | 1 | 6×10$^4$ | 12 | T | 500 | 6 | 220 | 0.19 | | | |
| EA(111)VP(1) | 1.5 | 2×10$^5$ | 12 | T | 500 | 4 | 100 | 0.17 | | | |
| BMA(111)VP(1) | 2 | 4×10$^4$ | 9 | T | 400 | 6 | 105 | 0.19 | | | |
| Polypropylene glycol | 2.5 | 4×10$^2$ | 22 | T | 173 | 8 | 250 | 0.32 | | | |
| Starch | 2.7 | | 23.5 | T | 188 | | 177 | 0.3 | | | |
| Hy-20 | 2.7 | 2×10$^4$ | 23.5 | T | 188 | | 173 | | | | |
| MMA(39)EA(72)VP(1) | 1.8 | 2×10$^5$ | †18 | MIBK | 200 | 3 | 117 | 0.22 | | | |
| V-PI | 2.7 | 4×10$^3$ | 23.5 | T | 188 | | 208 | 0.32 | | | |
| EG-MM-PPG(4025) | 2.7 | 2×10$^4$ | 23.5 | T / X | 188 / 37 | | 288 | 0.45 | | | |
| MM-PPG(3025) | 2.7 | 2×10$^4$ | 23.5 | T / X | 188 / 41 | | 265 | 0.45 | | | |
| CB60-PPG(3025) | 2.7 | 2×10$^4$ | 23.5 | T / X | 188 / 54 | | 254 | 0.39 | | | |
| MMA(50)VP(1) | 0.2 | 1×10$^5$ | 5.4 | T | 125 | 5 | *280 | 0.75 | | | |
| V-MM-DBA | 2.7 | 2×10$^4$ | 23.5 | T | 188 | | 208 | 0.36 | | | |
| MMA(37)EA(69)VP(1) | 2.7 | 3×10$^5$ | †19.7 | T | 220 | 5 | 252 | 0.57 | | | |
| MMA(39)EA(72)MAM(1) | 1.5 | 2×10$^5$ | 10 | T | 250 | 5.5 | 300 | 0.4 | 10/100T | 1.5 | 100–150 |
| EA(46)VP(1) | 2.7 | 1×10$^6$ | 23.5 | T / MIBK | 200 / 2.6 | | 156 | 0.39 | | | |
| Ph-F | 2.7 | 1×10$^3$ | 23.5 | T | 200 | | 188 | 0.33 | | | |

See footnotes at end of table.

Table I—Continued

| Polymer[1] | Polymer Gms. | Polymer Approx. M.W. | $Co^2(CO)_8$, gms. | Solvent[2] | Ml. | Time, hrs.[3] | Temp., °C. | Cast out of field $H_{ic}$ 5,000 | Cast out of field Br/Bs | Cast in field[6] $H_{ic}$ 5,000 | Cast in field[6] Br/Bs | Particle size, A. |
|---|---|---|---|---|---|---|---|---|---|---|---|---|
| MMA | 7 | 2×10⁵ | 6 | T/B | 100 | 5 | 105 | 200 | 0.4 | | | 150 |
| MMA | 1.7 | 2×10⁵ | 6 | T | 100 | 5 | 111 | | | 320 | 0.46 | |
| MMA | 2.3 | 2×10⁵ | 6 | T | 100 | 5 | 111 | | | 420 | 0.63 | |
| MMA | 7.0 | 2×10⁵ | 6 | T | 100 | 5 | 111 | | | 340 | 0.69 | |
| MMA(40)VP(1) | 4 | 1×10⁵ | 6 | T | 100 | 5 | 111 | 50 | 0.41 | | | 23 |
| MMA | 1.4 | 2×10⁵ | 0.6 | T | 100 | 5 | 111 | | | 340 | 0.63 | 150 |
| MMA(40)VP(1) | 1.2 | 2×10⁵ | 6 | T | 100 | 5 | 111 | | | 40 | 0.27 | 45 |
| MMA | 2.3 | 2×10⁵ | 6 | T/B | 100 | 5 | 100 | | | 200 | 0.5 | |
| MMA | 2.3 | 2×10⁵ | 6 | T/X | 100 | 5 | 120 | | | 420 | 0.57 | |
| MMA(40)VP(1) | 1.4 | 1×10⁵ | 6 | T | 100 | 5 | 111 | | | 120 | 0.75 | |
| MMA(40)VP(1) | 1.4 | 1×10⁵ | 2 | T | 100 | 5 | 111 | | | 40 | 0.17 | |
| MMA | 6.0 | 2×10⁵ | 6 | X | 100 | 5 | 137 | | | 550 | 0.58 | |
| MMA | 4.6 | 2×10⁵ | 6 | T | 100 | 5 | 111 | | | 20 | 0.3 | <50 |
| MMA | 4.6 | 2×10⁵ | 6 | T | 100 | 5 | 111 | 280 | 0.31 | 280 | 0.75 | |

[1] EA—ethyl acrylate.
VP—vinyl pyrrolidone.
VAc—vinyl acetate.
MMA—methyl methcrylate.
HPMA—hydroxypropyl methacrylate.
VCl—vinyl chloride.
VAl—vinyl alcohol.
VSt—vinyl stearate.
HEMA—hydroxyethyl methacrylate.
BMA—butyl methacrylate.
Hy-20—chlorosulfonated polyethylene (Du Pont Hypalon-20).
V—terephthalic acid (9) isophthalic acid (1) ethylene glycol polyester (4000 M.W.)—Vitel.
PI—phenyl isocyanate.
EG—ethylene glycol.
MM—diphenyl methane diisocyanate.
PPG(—)—polypropylene glycol (molecular weight).
CB-60—condensation product of 3 tolylene diisocyanate with 2-methylol-1,3-dihydroxypropane.
DBA—dibutyl amine.
MAM—methacrylamide.
Ph-F—phenol formaldehyde polymer with the para position of the phenol blocked with a tertiary alkyl group (Bakelite 1282).

[2] T—toluene.
MIBK—methyl isobutyl ketone.
X—xylene.
B—benzene.

[3] When no time is stated, the runs were carried out to theoretical carbon monoxide evolution.
[4] Grams of metal compound dissolved in ml. of solvent.
[5] Rate of addition of solution of metal compound to solution of polymer.
[6] Sample was cast in a 3000 oe. field.
* 5000 oe. field.
† [CoAct]₆[Co₂Fe(Co)₁₂]₂-Act-acetone.
‡ Tetracobalt dodecacarbonyl.

Table II

| Polymer[1] | Polymer gms. | Polymer Approx. M.W. | $Fe(CO)_5$, ml. | Solvent[2] | Ml. | Time[5] (hrs.) | $H_{ic}$ 1,000 oe. | Br/Bs |
|---|---|---|---|---|---|---|---|---|
| VAc | 2.5 | 3×10⁵ | 14 | C | 250 | 20 | 400 | 0.5 |
| HMA | 1 | 8×10⁴ | 14 | C | 250 | 20 | 310 | 0.45 |
| S | 5 | 2×10⁵ | 12 | C | 125 | 30 | 290 | 0.31 |
| S-alkylated | 2.5 | 5×10⁵ | 14 | C | 125 | 20 | 210 | 0.17 |
| LMA | 1.0 | 3×10⁵ | 14 | C | 250 | 17 | 80 | 0.10 |
| HMA | 2.5 | 8×10⁴ | 14 | X | 100 | 8 | 380 | 0.31 |
| | | | | C | 150 | | | |
| MMA | 12.3 | 1×10⁵ | 10 | B | 4,000 | 24 | 650 | † |
| MMA | 7.5 | 1×10⁵ | 10.4 | X | 355 | 8 | 150 | |
| | | | | Te | 395 | | | |
| EMA | 40.4 | 2×10⁵ | 502 | T | 8,122 | 18 | 115 | ‡ 0.20 |
| | | | | MIBK | 1,600 | | | |
| MMA(69)EA(72)VP(1) | 0.8 | 2×10⁵ | *(7.7 gms.) | T | 100 | 3 | 330 | 0.30 |
| EA(500)HEMA(1) | 3 | 3×10⁵ | 25 | A | 240 | | 21 | |
| S(300)HEMA(1) | 3 | 7×10⁴ | 25 | T | 235 | | 197 | |
| BMA(300)HEMA(1) | 3 | 3×10⁵ | 25 | X | 240 | | 7.9 | |
| HMA(75)HEMA(1) | 3 | 2×10⁵ | 25 | X | 240 | | 6.6 | |

| Polymer | Polymer gms. | Polymer Approx. M.W. | $Fe(CO)_5$, gms. | Solvent[2] | ml. | Time[4] (hrs.) | Temp., °C. | Cast out of field $H_{ic}$ 5,000 | Cast out of field Br/Bs | Cast in[3] field $H_{ic}$ 5,000 | Cast in[3] field Br/Bs |
|---|---|---|---|---|---|---|---|---|---|---|---|
| MMA | 0.4 | 2×10⁵ | 0.25 | B | 100 | 48 | 80 | 660 | 0.4 | | |
| MMA | 0.5 | 2×10⁵ | 1 | Te | 100 | 2 | 200 | | | 100 | 0.3 |
| DMA(7)VP(1) | 1.0 | | 2 | Te/X | 100 | 8 | 160 | 330 | 0.4 | | |
| MMA | 1.0 | 2×10⁵ | 2 | Te/X | 100 | 8 | 160 | | | 150 | 0.3 |
| MMA | 1.0 | 2×10⁵ | 2 | X | 100 | 24 | 135 | 500 | 0.4 | | |
| MMA | 1.0 | 2×10⁵ | 2 | X | 100 | 72 | 135 | 150 | 0.15 | | |
| MMA | 1.0 | 2×10⁵ | 2 | X | 100 | 48 | 137 | 100 | <0.1 | | |
| MMA | 1.0 | 2×10⁵ | 2 | X | 100 | 48 | 137 | 260 | 0.25 | | |
| MMA | 1.0 | 2×10⁵ | 2 | X | 100 | 48 | 137 | | | 80 | 0.2 |
| MMA | 1.0 | 2×10⁵ | 2 | X | 100 | 48 | 137 | 250 | 0.2 | | |
| MMA | 1.0 | 2×10⁵ | 2 | X | 100 | 48 | 137 | 530 | 0.3 | | |

[1] VAc—vinyl acetate.
HMA—hexyl methacrylate.
S—styrene.
S-alkylated—styrene alkylated (Santodex Monsanto).
LMA—lauryl methacrylate.
MMA—methyl methacrylate.
EMA—ethyl methacrylate.
EA—ethyl acrylate.
VP—vinyl pyrrolidone.
HEMA—hydroxyethyl methacrylate.
BMA—butyl methacrylate.
HMA—hexyl methacrylate.
DMA—dodecyl methacrylate.

[2] B—benzene.
Te—tetralin.
X—xylene.
C—cumene.
MIBK—methyl.
A—anisole.

[3] Field was 3000 oe.
[4] When no time is indicated, the reaction was carried out to theoretical carbon monoxide evolution.
* [Fe(CO)₄]₃.
† Under 200 p.s.i. N₂; temp. 180° C.
‡ 60.9 g. Co₂(CO)₈ included.

Illustrative of other polymers are:
MMA(40)EA(45)MAM(1);
MMA(85)EA(15)MAM(1);
MMA(10)EA(95)MAM(1);
VAc(500)VP(1);
MMA(50)EA(50)HPMA(1);
MMA(25)EA(45)HPMA(1);
MMA(75)EA(25)HPMA(1);
VAc(200)VSt(200)VP(1);
poly-4-methylphenol-formaldehyde;
sebacic acid-octamethylene diamine; etc.

The symbols are defined as in Tables I and II.

While the polymers which must be used to prepare the novel compositions are restricted to those described, once the metal-polymer composition has been prepared, the polymer can be replaced for the most part by another polymer.

The exchange may be achieved by leaching away the polymer with a solvent, dispersing the resulting polymer metal composition in a different polymer or solution of a different polymer, and then further extracting this composition with solvent. Partition between the metal-polymer composition and the solvent can be achieved by various methods, such as centrifugation, sedimentation, etc. Usually, little of the original polymer will remain. The following example will illustrate the method. The example can be repeated removing more of the polymer.

EXAMPLE A

A sample containing a slurry of 1.87 grams of cobalt particles, 0.18 gram of polymer (methyl methacrylate:ethyl acrylate:vinyl pyrrolidone) and 9.65 grams of toluene was mixed with 55.5 grams of a chloroform-toluene solution, containing 5.8 parts of chloroform to 1 part of toluene, and vigorously shaken. The mixture was allowed to settle and the supernatant liquid carefully decanted. The remaining slurry contained 14.4 grams: 12.9 grams of volatile material (toluene and chloroform), 1.87 grams of cobalt particles and 0.066 gram of polymer. Evaporation of the solvent yielded a product containing 96.6% cobalt and having excellent magnetic properties.

By introducing a different polymer into the extracting solution, polymer exchange results.

The polymer compositions prepared according to the method of this invention are unique. Each particle as it is formed is encapsulated with polymer. Secondly, stable suspensions of the particles can be obtained in low dielectric media (<20). By stable suspensions is meant a particulate system in which sedimentation is not observed in a period of one day under ambient conditions and normal gravitational force. Thirdly, the particles are of relatively uniform size.

The dispersed particles are easily rotated in the dispersion. Polymer-particle films can be dried in a magnetic field to become magnetically anisotropic in directions parallel and perpendicular to the orienting field. By orienting the particles, relatively square hysteresis loops can be obtained. Therefore, when the field is removed, a high percentage of the maximum saturation will remain. The orientation occurs even though the particles are frequently nearly spherical and of small size. The effects of such orientation can be profound and have no counterpart in systems prepared by other than this invention.

The compositions containing the metal particles have a wide variety of uses. The colloidal suspensions are useful as magnetic inks. Particles which have significant coercive forces may be used in various magnetic recording devices. The metals dispersed in the polymer provide a unique and convenient way for coating magnetic recording devices, such as tapes, disc, drums, etc. The small size of the particle permits a smooth coat, without particles sticking out of the polymer at the surface; also, the noise level of magnetic recording coatings is materially reduced. Moreover, high pulse packing density can be obtained. The high saturation magnetization of the metal particles gives enhanced output, resulting in excellent high and low frequency response.

Permanent magnets may be prepared with the compositions containing the ferromagnetic particles. The metal-polymer composition may be embedded in any of a variety of polymers to form a solid material. These permanent magnets can be of light weight and permit easy machineability, moldability and fashioning.

The dispersions of the very small particles—less than 100 A.—have many potential applications. Because of their superparamagnetic properties, they may be coated on communication cables and reduce the signal attenuation by raising the impedance of the transmission line. Furthermore, due to the extremely small size of the particles and the fact that they are electrically insulated from one another by the polymeric agent, such materials will show no eddy current loss at frequencies where other materials, even the commonly used powdered metals which have particle size in the neighbor of 1 micron, become unusable in high frequency electronic components due to excessive eddy current loss. The compositions can also be used in high frequency coils and transformers, as well as numerous other applications which require the soft magnetic properties of these extremely small particles.

As will be evident to those skilled in the art, various modifications on this process can be made or followed, in the light of the foregoing disclosure and discussion, without departing from the spirit or scope of the disclosure or from the scope of the following claims.

I claim:

1. A method for preparing discrete particles from 10 to 1,000 A. of at least one metal of atomic number 26 to 28, dispersed in an organic medium,
   which comprises thermally decomposing at a temperature in the range of about 60° to 250° C. in the liquid phase an organo-metallic compound of said metal having at least one coordinate bond to carbonyl in the presence of an inert organic solvent of dielectric constant in the range of 1.5 to 20,
   and a soluble hydrocarbon containing polymer having at least 350 molecular weight and an average dipole moment of from about 0.005 to 1.0 D./atom other than hydrogen in the polymer.

2. A method for preparing discrete particles from 10 to 1,000 A. of at least one metal of atomic number 26 to 28, dispersed in an organic medium,
   which comprises thermally decomposing at a temperature in the range of about 60° to 250° C. in the liquid phase an organo-metallic compound of said metal having at least one coordinate bond to carbonyl in the presence of an inert organic solvent of dielectric constant in the range of 1.5 to 20,
   and a soluble hydrocarbon containing polymer having at least 350 molecular weight and an average dipole moment of from about 0.01 to 2.5 D./atom in the polymer chain.

3. A method for preparing discrete particles from 10 to 1,000 A. of at least one metal of atomic number 26 to 28, dispersed in an organic medium,
   which comprises thermally decomposing at a temperature in the range of about 60° to 250° C. in the liquid phase an organo-metallic compound of said metal having at least one coordinate bond to carbonyl in the presence of an inert organic solvent of dielectric constant in the range of 1.5 to 20,
   and less than 10% by weight of solvents having acid groups of dissociation constant of greater than $10^{-11}$ and a polymer having at least 400 molecular weight and an average dipole moment of from about 0.01 to 2.5 D./atom in the polymer chain.

4. A method according to claim 3, wherein said organo-metallic compound is a metal carbonyl.

5. A method according to claim 3, wherein said organo-metallic compound is a cobalt carbonyl.

6. A method according to claim 3, wherein said organo-metallic compound is an iron carbonyl.

7. A method for preparing discrete particles of from 10 to 1,000 A. of at least one metal of atomic number 26 to 28, dispersed in an organic medium, which comprises thermally decomposing in the liquid phase an organo-metallic compound of said metal wherein all bonds are coordinately bonded to carbonyl, at a temperature in the range of about 60 to 250° C., in the presence of an inert organic solvent of dielectirc constant in the range of about 1.5 to 20 and having less than 10% by weight of solvents having acid groups of acid dissociation constant of greater than $10^{-11}$ and a soluble addition polymer of at least 400 molecular weight having an average dipole moment in the range of about 0.005 to 1.0 D./atom other than hydrogen in the polymer.

8. A method according to claim 7 wherein said polymer has 1 group per 1 to 1,000 atoms in the polymer backbone of a dipole moment of greater than 1.5 D., and said group is substantially uniformly distributed.

9. A method according to claim 7 wherein said polymer has 1 group per 1 to 500 atoms along the polymer backbone of a dipole moment of greater than 1.5 D., and said group is substantially uniformly distributed.

10. A method according to claim 7 wherein said polymer is an acrylic polymer.

11. A method according to claim 7 wherein said polymer is a polystyrene.

12. A method according to claim 7 wherein said polymer is a polar modified hydrocarbon polymer.

13. A method for preparing discrete particles of a size from 10 to 1,000 A., of at least one metal of atomic number 26 to 28, dispersed in an organic medium, which comprises thermally decomposing in the liquid phase an organo-metallic compound of said metal which has all bonds coordinately bonded to carbonyl, at a temperature in the range of about 60 to 250° C., in the presence of an inert, organic solvent of a dielectric constant in the range of from about 1.5 to 20 and having less than 10% by weight of solvents of acid dissociation constant of greater than $10^{-11}$, and a soluble condensation polymer of at least 400 molecular weight, having an average dipole moment in the range of from about 0.005 to 1.0 D./atom other than hydrogen in the polymer.

14. A method according to claim 13 wherein the polymer is a polyethylene glycol polymer.

15. A method according to claim 13 wherein the polymer is a polyester.

16. A method according to claim 13 wherein the polymer is a polyurethane.

17. A method for preparing discrete particles of a size from 10 to 1,000 A. of at least one metal of atomic number 26 to 28, dispersed in an organic medium, which comprises thermally decomposing in the liquid phase a metal carbonyl of said metal at a temperature in the range of about 60° to 250° C., in the presence of an inert aromatic solvent of a dielectric constant in the range of about 1.7 to 6 and a soluble organic polymer of at least 1,000 molecular weight and an average dipole moment of from about 0.01 to 2.5 D./atom in the polymer chain, and having at least 60% by number of addition polymerizable monomers of up to 25 carbons having an ester functionality.

18. A method according to claim 17, wherein said metal is iron.

19. A method according to claim 17, wherein said metal is cobalt.

20. A method for preparing discrete particles of a size from 10 to 1,000 A., of at least one metal of atomic number 26 to 28, dispersed in an organic medium, which comprises thermally decomposing in the liquid phase a metal carbonyl of said metal at a temperature in the range of about 60° to 250° C., in the presence of an inert aromatic solvent of a dielectric constant in the range of about 1.7 to 6 and a soluble organic polymer of at least 1,000 molecular weight and an average dipole moment of from about 0.01 to 2.5 D./atom in the polymer chain, and having at least 60% by number of chloroprene monomer.

21. A method for preparing discrete particles of a size from 10 to 1,000 A., of at least one metal of atomic number 26 to 28, dispersed in an organic medium, which comprises thermally decomposing in the liquid phase a metal carbonyl of said metal at a temperature in the range of about 60° to 250° C., in the presence of an inert aromatic solvent of a dielectric constant in the range of about 1.7 to 6 and a soluble organic polymer of at least 1,000 molecular weight and an average dipole moment of from about 0.01 to 2.5 D./atom in the polymer chain, and wherein said soluble organic polymer is a modified hydrocarbon polymer, which has been modified with members of the group consisting of sulfonic esters, sulfonamides, chloro, bromo, nitro and hydroxy and containing 0.1 to 40% by weight of other than hydrocarbon.

22. A method for preparing discrete particles of a size from 10 to 1,000 A., of at least one metal of atomic number 26 to 28, dispersed in an organic medium, which comprises thermally decomposing in the liquid phase a metal carbonyl of said metal at a temperature in the range of about 60° to 250° C., in the presence of an inert aromatic solvent of a dielectric constant in the range of about 1.7 to 6 and a soluble organic polymer of at least 1,000 molecular weight and an average dipole moment of from about 0.01 to 2.5 D./atom in the polymer chain, and wherein said soluble organic polymer is a condensation polymer selected from the group consisting of polyepoxides, polyesters, polyamides, polyaldehydes, phenol-aldehyde, urea-aldehyde and cellulose.

23. A method for preparing discrete particles of a size from 10 to 1,000 A., of at least one metal of atomic number 26 to 28, dispersed in an organic medium, which comprises thermally decomposing in the liquid phase a metal carbonyl of said metal at a temperature in the range of about 60 to 250° C. in the presence of an inert aromatic solvent of a dielectric constant in the range of about 1.7 to 6 and a soluble organic polymer of at least 1,000 molecular weight and an average dipole moment of about 0.005 to 1.0 D./atom other than hydrogen in the polymer, and having at least 60% by number of addition polymerizable monomers of up to 25 carbons having the formula:

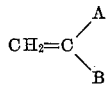

wherein A is a radical having a functionality bonded to the vinyl carbon selected from the group consisting of halo, carbonylic, oxy, amino, cyano, and nitro and B is selected from the group consisting of A, hydrogen, aryl hydrocarbon and aliphatic hydrocarbon.

24. A method according to claim 23, wherein A is a carbonylic functionality.

25. A method for preparing discrete particles of a size from 10 to 1,000 A., of at least one metal of atomic number 26 to 28, dispersed in an organic medium, which comprises decomposing by ultraviolet light, at a temperature in the range of about −50° to 300° C., in the liquid phase, an organic-metallic compound of said metal having at least one coordinate bond to carbonyl, in the presence of an inert aromatic solvent of a dielectric constant in the range of 1.5 to 20, and
a soluble hydrocarbon containing polymer having at least 350 molecular weight and an average dipole moment in the range of from about 0.005 to 1.0 D./atom other than hydrogen in the polymer.

26. A composition consisting essentially of a stable dispersion of particles of at least one metal of atomic number 26 to 28, wherein at least 85% by weight of the metal component resides in particles characterized in the following manner:
(1) discrete,
(2) encapsulated with an organic polymer,
(3) a size of from about 10 to 1,000 A.,
(4) a size within 50% of the mean size,
(5) orientable in a magnetic field,
said composition having from 0.1 to 98% by weight of metal in conjunction with a polymer of at least 350 molecular weight and an average dipole moment of from about 0.005 to 1.0 D./atom other than hydrogen in the polymer, wherein the weight ratio of polymer to metal is at least about 0.01, and prepared as described in claim 1.

27. A composition consisting essentially of a stable colloidal suspension of particles of at least one metal of atomic number 26 to 28,
wherein at least 85% by weight of the metal component resides in the particles characterized in the following manner:
(1) discrete,
(2) encapsulated with an organic polymer,
(3) a size of from about 10 to 1,000 A.,
(4) a size within 50% of the mean size,
(5) orientable in a magnetic field,
said composition having: a polymer of at least 5,000 molecular weight and an average dipole moment of from about 0.005 to 1.0 D./atom other than hydrogen in the polymer; and a solvent,
wherein the solvent is at least 65% by weight of the total composition, the weight of metal is in the range of about 0.01 to 15% and the weight ratio of polymer to metal is in the range of about 0.1 to 5, and prepared as described in claim 1.

28. A composition consisting essentially of a stable dispersion of particles of at least 1 metal of atomic number 26 to 28, wherein at least 85% by weight of the metal component resides in particles characterized in the following manner:
(1) discrete,
(2) encapsulated with an organic polymer,
(3) a size of from about 10 to 1,000 A.,
(4) a size within 50% of the mean size,
(5) orientable in a magnetic field,
said composition having from 0.1 to 98% by weight of metal in conjunction with a polymer of at least 350 molecular weight and an average dipole moment of from about 0.01 to 2.5 D./atom in the polymer chain and having at least 60% by number of monomers having an ester functionality, wherein the weight ratio of polymer to metal is at least 0.01, and prepared as described in claim 1.

29. A composition according to claim 28, wherein said metal is iron.

30. A composition according to claim 28, wherein said metal is cobalt.

References Cited by the Examiner

UNITED STATES PATENTS

| | | | |
|---|---|---|---|
| 1,805,199 | 5/1931 | Alleman | 44—51 |
| 2,635,041 | 4/1953 | Hansley et al. | 44—51 |
| 2,651,105 | 9/1953 | Neel. | |
| 2,927,849 | 3/1960 | Greblick et al. | 44—51 |
| 2,947,646 | 8/1960 | Devaney et al. | |
| 2,974,104 | 3/1961 | Paine et al. | |
| 2,989,415 | 6/1961 | Horton et al. | |
| 3,014,818 | 12/1961 | Campbell | 252—513 |
| 3,073,785 | 1/1963 | Angelo | 252—513 |

FOREIGN PATENTS 616,839  1/1949  Great Britain.

OTHER REFERENCES

Horn: Acrylic Resins, Reinhold Publ. Corp., 1960.
Paine et al. (2): "Fine-Particle Magnets," Electrical Engineering, vol. 76, October 1957, pages 851–857.
Smith: Vinyl Resins, Reinhold Publ. Corp., 1958.

TOBIAS E. LEVOW, *Primary Examiner.*

MAURICE A. BRINDISI, *Examiner.*